United States Patent Office 2,895,763
Patented July 21, 1959

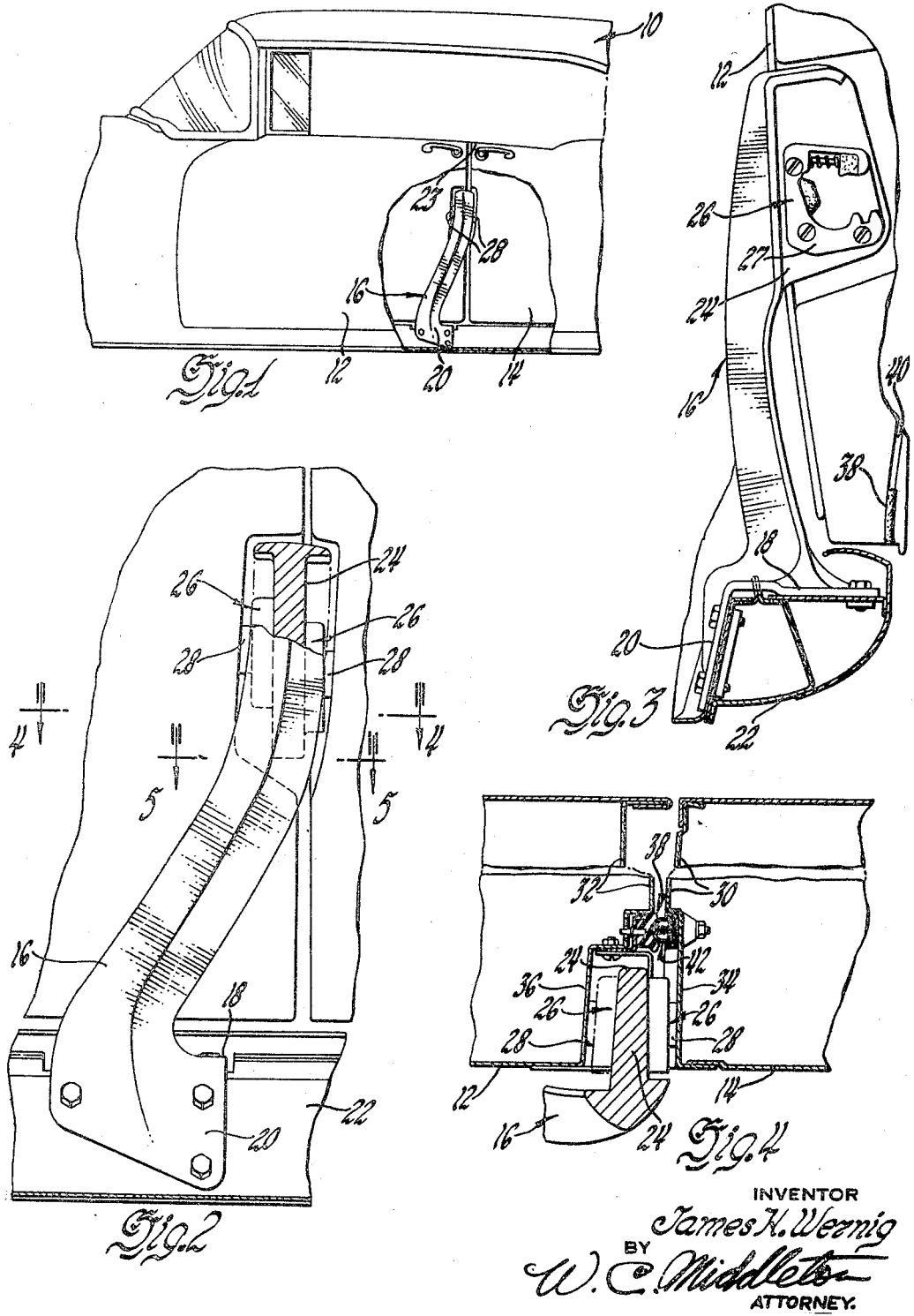

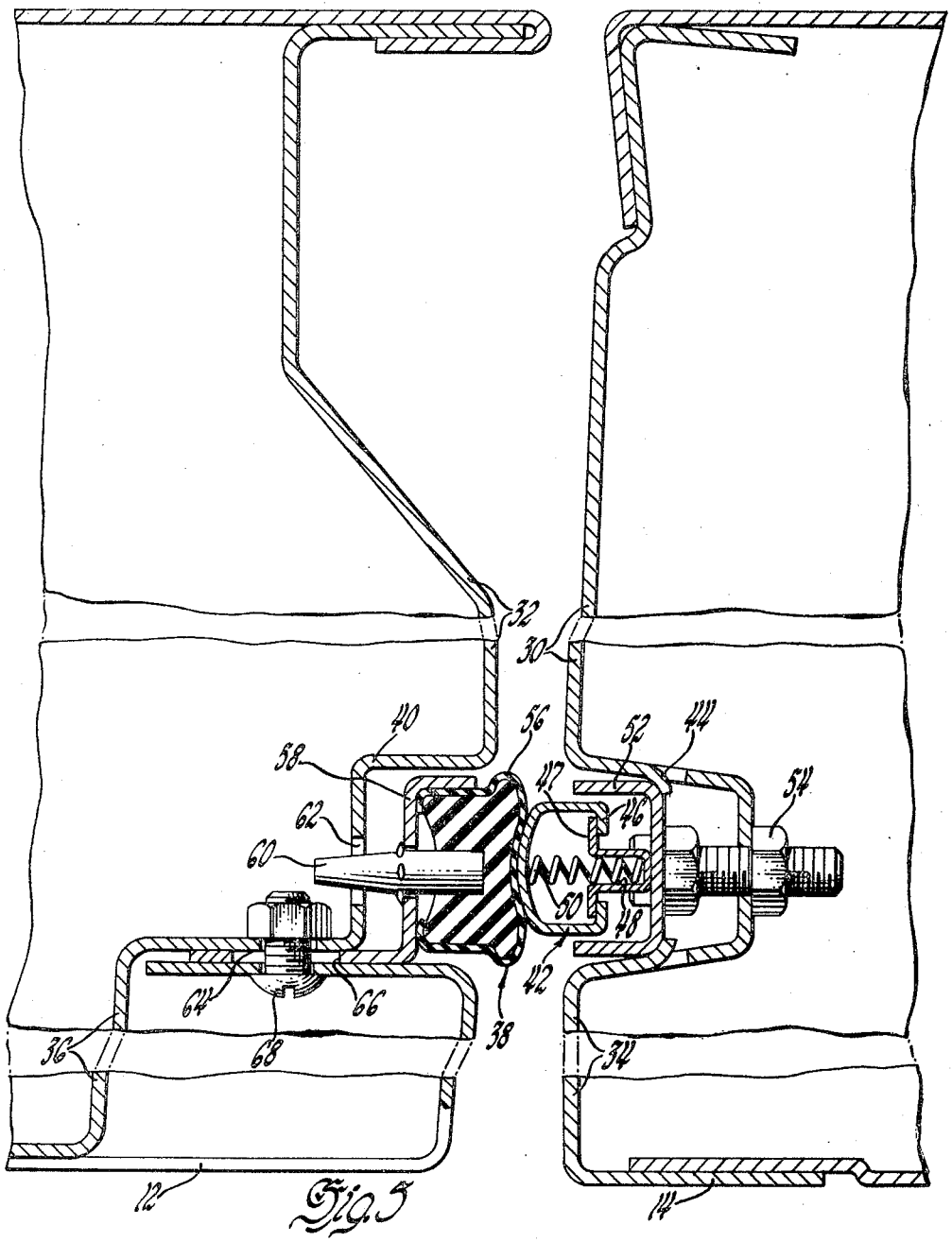

2,895,763

VEHICLE BODY STRUCTURE

James H. Wernig, Birmingham, Mich., assignor to General Motors Corporation, Detroit, Mich., a corporation of Delaware Application October 24, 1956, Serial No. 618,018

6 Claims. (Cl. 296—28)

This invention relates generally to vehicle bodies and particularly to supporting members or door pillars for vehicle bodies.

Conventionally, in four-door hardtop type bodies a door pillar is employed intermediate and adjacent the marginal edges of the front and rear doors. This pillar may hingedly support one or both of the doors and also provide a striker surface for detachably securing closed one or both of the doors when they are not hinged to the pillar. With the present styling trends in vehicle bodies, especially those of the four-door hardtop type, it is desirable either to eliminate or reduce the size of this pillar so that it is not apparent from the exterior of the vehicle.

With these considerations in mind, it is proposed to provide a supporting member that is not visible from the exterior of the vehicle when the doors are closed; that has only a portion extending between the doors into a recess or pocket therebetween; that is adapted to provide a striker surface for releasably securing the doors closed; and that is relatively small in size as compared to conventional pillars and extends from the floor to below the body belt line.

In carrying out the foregoing, a supporting member is rigidly attached to a floor portion of the body and extends vertically upwardly to a point below the body belt line. Only a flange section of the supporting member projects within and is concealed by a recess or pocket formed by the closed doors. This flange is adapted to provide striker surfaces for detachably holding the doors closed. Adjustable sealing means are disposed between the door jamb faces to prevent leakage therebetween.

The foregoing and other objects and advantages of the invention will be apparent from the following description and from the following drawings, in which:

Fig. 1 is an elevational view of a vehicle body with a portion cut out to show the inboard side of a supporting member mounted on the opposite side of the body.

Fig. 2 is an enlarged fragmentary view of the supporting member similar to the Fig. 1 showing.

Fig. 3 is a fragmentary view of the supporting member from the rear of the vehicle body in Fig. 1.

Fig. 4 is a sectional view taken along line 4—4 of Fig. 2.

Fig. 5 is an enlarged sectional view taken along line 5—5 of Fig. 2.

In Figure 1, an embodiment of the invention is shown incorporated in a vehicle body 10. The body is of the four-door hardtop type and includes on each side a pair of closure members such as a front door 12 hingedly mounted at its front end and a rear door 14 hingedly mounted at its rear end. Consequently, the doors swing outwardly from the remote ends thereof.

To hold the doors 12 and 14 closed, a supporting member or pillar 16 is formed with a top flange 18 and a side flange 20, which flanges are bolted or otherwise secured to a floor portion 22 of the vehicle body. The pillar 16 extends substantially vertically upwardly and terminates at a point somewhat below the body belt line 23. As illustrated in Figure 3, the pillar is mounted on the inboard side of the vehicle body and has a mounting flange 24 at the upper end which extends outwardly or outboard from the pillar. This mounting flange, which is the only part of the pillar projecting between the doors, supports a pair of suitable oppositely disposed strikers, e.g., strikers 26 each having a toothed element 27 for cooperation with a suitable latch bolt. Preferably the latch bolts are of the rotary bolt type (not shown) mounted on a shaft 28 carried by the doors. The striker and latch together detachably secure the front and rear doors 12 and 14 to the pillar 16 and may be of the type disclosed in the application Cockburn et al., Serial No. 392,266, filed November 16, 1953, having a common assignee.

In the vicinity of the mounting flange 24 a jamb face 30 on the rear door 14 is formed with a lateral offset 34 inboard of the outer marginal edge of the door and the jamb face 32 on the front door 12 is provided with a similar lateral offset 36. As demonstrated in Figure 4, when the front and rear doors are closed, the offsets 34 and 36 provide a pocket which receives the mounting flange. The jamb face 32 extends rearwardly a sufficient distance to completely obscure the pillar from view exterior of the vehicle body when the doors are closed.

Any suitable sealing means may be provided between the doors outboard of the pillar for keeping out the elements from the interior of the body. Preferably, a resilient sealing member 38 is disposed in a channel 40 in the front door 12 and a rigid sealing member 42 is retained in a channel 44 in the rear door 14. The rigid sealing member has an arcuate sealing surface and opposed laterally inwardly extending edges 46 which engage laterally outwardly extending ends 47 of the retainer element 48. A series of springs 50 are interposed between the sealing member 42 and the retainer element 48 to bias the member 42 outwardly from the door jamb face. A U-shaped bracket 52 is secured to the retainer element 48 and retained by bolts 54 or otherwise suitably secured to the base of the channel 44. The resilient member 38 is made of suitable material, such as sponge rubber, having a protective cover means 56. A series of pins 60 are attached to an L-shaped member 58, which pins are embedded in the rubber material of the sealing member to provide a unit assembly comprising the pins 60, sealing member 38 and the L-shaped member 58. The pins 60 have a tapered end which is received in a series of alignment holes 62 at the base of the channel 40 to position the sealing member during installation.

To allow adjustment longitudinally and vary the sealing engagement between the sealing member 38 and the sealing member 42 an arm 64 on the L-shaped member 58 is provided with an elongated slot 66. A screw 68 passes through this slot and clampingly retains this L-shaped member in the desired position. When an adjustment is made, the screw 68 is loosened so that the L-shaped member 58 can be moved to a new position and then the bolt 68 is re-tightened.

When the doors are closed, the arcuate surfaces of the resilient sealing member 38 and the rigid sealing member 42, which are especially adapted to allow unimpeded opening and closing of the doors, engage with the resilient sealing member being deformed and the rigid sealing member moving inwardly to compress the springs 50.

I claim:

1. In combination with a vehicle body having an opening therein and having a belt line, a pair of closure members for the opening swingably mounted on the body for movement between open and closed positions and having jamb faces in spaced adjacent relation in the closed positions thereof, each of said jamb faces along a relatively small part of the total jamb face area below the belt line being offset laterally of the closure member and inboard of the outer marginal edge thereof to provide a pocket inboard of the body, a support member mounted on the body inboard of the closure members and laterally displaced from the adjacent jamb faces of the closure members when in the closed positions so as to extend from a floor portion to below the body belt line, said support member having a flange portion thereof projecting within said pocket and being concealed from exterior view in the closed positions of said closure members and means on said support member flange portion cooperable with means on said closure members to detachably secure said closure members to said support member in the closed positions thereof.

2. In a vehicle body, the combination comprising, adjacent doors hingedly mounted at remote ends thereof for swinging movement to and from closed positions and having jamb faces in spaced juxtaposed relation at adjacent ends of the doors when in the closed positions, each of said jamb faces offset laterally of the door and inboard of the outer marginal edge thereof to provide a pocket inboard of the body, a support member mounted on the body inboard of the doors and laterally displaced from the adjacent jamb faces of the doors when in the closed positions so as to extend from a floor portion to below the body belt line, said support member having a flange portion thereof projecting within said pocket and being concealed from exterior view in the closed positions of said doors, means on said support member flange portion cooperable with means on said doors to detachably secure said doors to said support member in the closed position thereof and sealing means having a rigid element connected to one door and a resilient element connected to the other door, said elements coacting to provide a sealing engagement therebetween in the closed positions of said doors.

3. In a vehicle body, the combination comprising adjacent doors hingedly mounted at remote ends thereof for swinging movement to and from closed positions and having jamb faces in spaced juxtaposed relation at adjacent ends of the doors when in the closed positions, one of the jamb faces having a laterally offset portion extending crosswise along a relatively small part of the total jamb face area so as to define a pocket opening inboard of the door, a support member mounted on the body inboard of the doors and extending from a floor portion of the vehicle to below the body belt line, the support member being positioned remotely of the space between the jamb faces when the doors are in the closed positions so as to be concealed from exterior view, a flange on the support member extending outboard therefrom and projecting into the pocket, the pocket surrounding the flange when the doors are in the closed positions so that the flange is concealed from exterior view, and means on the flange arranged to cooperate with means on the doors to detachably secure the doors in the closed positions thereof to the support member.

4. In a vehicle body, the combination comprising adjacent doors hingedly mounted at remote ends thereof for swinging movement to and from closed positions and having jamb faces in spaced juxtaposed relation at adjacent ends of the doors when in the closed positions, each of the jamb faces along a relatively small part of the entire jamb face area below the belt line being offset laterally of the door and inboard of the outer marginal edge thereof so as to provide a pocket that opens inboard of the body, a support member mounted inboard of the doors and having the base thereof connected to a floor portion of the vehicle remotely of the space between the jamb faces so that when the doors are in the closed positions the support member is concealed from exterior view, the support member extending upwardly from the floor portion to below the body belt line, a flange formed on the upper terminal end of the support member and extending outboard thereof, the flange being offset relative to the base of the support member and projecting into the pocket in the closed positions of the doors so as to be surrounded thereby, one of the jamb faces being offset laterally more than the other so that the flange is concealed from exterior view in the closed positions of the doors, and means on the flange coacting with the means on the doors to detachably secure the doors in the closed positions thereof to the support member.

5. In a vehicle body, the combination comprising adjacent doors hingedly mounted at remote ends thereof for swinging movement to and from closed positions and having jamb faces in spaced juxtaposed relation at adjacent ends of the doors when in the closed positions, each of the jamb faces along a relatively small part of the entire jamb face area below the belt line being offset laterally of the door and inboard of the outer marginal edge thereof so as to be partially recessed and thereby afford a pocket that opens inboard of the body, a pillar disposed inboard of the doors and having the bottom end attached to a floor portion of the vehicle remotely of the space between the jamb faces so that when the doors are in the closed positions the pillar is concealed from exterior view, a flange formed on the upper end of the pillar and extending inboard thereof, the pillar being angularly shaped so as to extend upwardly to below the body belt line and position the flange within the pocket in the closed positions of the door, one of the jamb faces being offset laterally more than the other so that the flange is concealed from exterior view in the closed positions of the doors, a striker means on the flange, and latch means on the doors coacting with the striker means to detachably secure the doors to the pillar in the closed positions thereof.

6. In a vehicle body, the combination comprising adjacent doors hingedly mounted at remote ends thereof for swinging movement to and from closed positions and having jamb faces in spaced juxtaposed relation at adjacent ends of the doors when in the closed positions, one of the jamb faces along a relatively small part of the entire jamb face area below the belt line being offset laterally of the door and inboard of the outer marginal edge thereof so as to provide a pocket that opens inboard of the body, a support member mounted inboard of the doors and extending from a floor portion of the vehicle to below the body belt line, the support member being positioned remotely of the space between the jamb faces when the doors are in the closed positions so as to be concealed from exterior view, a flange on the support member extending outboard therefrom and projecting into the pocket, the pocket surrounding the flange when the doors are in the closed positions so that the flange is concealed from exterior view, means on the flange coacting with the means on the doors to detachably secure the doors in the closed positions thereof to the support member, each door being provided with a sealing element situated along the jamb face thereof and engageable in the closed positions of the doors, and means for adjusting one of the sealing elements relative to the other so as to maintain a sealing engagement therebetween.

References Cited in the file of this patent

UNITED STATES PATENTS

| | | |
|---|---|---|
| 1,826,922 | Carr | Oct. 13, 1931 |
| 1,847,965 | Humer | Mar. 1, 1932 |

FOREIGN PATENTS

| | | |
|---|---|---|
| 406,613 | Great Britain | Mar. 1, 1934 |